United States Patent
Bechtloff et al.

[11] 3,880,274
[45] Apr. 29, 1975

[54] COVER BELT CONVEYOR

[75] Inventors: Gert Bechtloff, Wilhelmshaven; Reinhold Szonn, Lemforde, both of Germany

[73] Assignee: Gert Bechtloff

[22] Filed: July 31, 1973

[21] Appl. No.: 384,239

[30] Foreign Application Priority Data
July 31, 1972 Germany............................ 2237689

[52] U.S. Cl. ................ 198/165; 198/193; 226/172
[51] Int. Cl. ........................................... B65g 15/14
[58] Field of Search .......... 198/165, 162, 193, 184; 226/172

[56] References Cited
UNITED STATES PATENTS
| | | | |
|---|---|---|---|
| 3,319,776 | 5/1967 | Bechtloff et al. | 198/165 |
| 3,446,332 | 5/1969 | Bechtloff | 198/165 |

*Primary Examiner*—James B. Marbert
*Assistant Examiner*—Jeffrey V. Nase
*Attorney, Agent, or Firm*—McGlew and Tuttle

[57] ABSTRACT

A cover belt conveyor assembly includes two belt conveyors running, at least in a part of the conveying distance, in initial contact and in the same direction. At least one of the conveyor belts has, on a surface facing the other belt, a thick, resiliently deformable layer of a plastic foam material for enclosing articles to be conveyed. In the zone of the neutral plane resulting from deformation of the plastic foam layer, respective strips extend laterally from the opposite longitudinal edges of the belt and engage support means, such as rollers, at least in the area of deformation of the plastic foam layer. A back-up roller may be provided for the layer and is spaced from such neutral plane by the thickness of the unloaded and non-deformed plastic foam layer. The plastic foam layer may be covered by a skin of a tougher material, and reinforcements may be embedded in the laterally projecting strips to extend longitudinally of the belt.

34 Claims, 9 Drawing Figures

COVER BELT CONVEYOR

FIELD AND BACKGROUND OF THE INVENTION

The present invention is directed to a cover belt conveyor comprising an assembly of two belt conveyors which, in at least part of the conveying distance, are in mutual contact and run in the same direction, at least one of the two belt conveyors being provided, on a side facing the other conveyor, with a thick resiliently deformable layer of plastic foam or the like serving to enclose products to be conveyed.

In a known conveyor of this type, the cover belt having the plastic foam band is guided around deflection rollers which may serve simultaneously as driving means. As, both for guiding and driving, the conveyor belt having the plastic foam band must be passed around the deflection rollers under prestress, the cross section of the plastic foam band becomes strongly squeezed in the deflection area, so that not only is the guidance inaccurate but also the foam band is prematurely worn out and conveyance is defective.

SUMMARY OF THE INVENTION

The invention is directed to the problem of providing a cover belt conveyor of the type mentioned above in which squeezing of the foam band, in the deflection area, is substantially prevented and perfect guidance is assured. In accordance with the invention, this problem is solved by mounting the conveyor belt, carrying the foam band, approximately in the zone of the neutral plane resulting from the deflection, in the deflection area, so that the conveyor belt projects from both of the lateral sides of the plastic foam band, the projecting lateral strips of the belt being supported, at least in the deflection area, by support rollers or the like.

With this arrangement, the plastic foam band, rather than being supported at the level of its inner radius, is supported at the level of its neutral plane or fiber, so that, in the deflection area, the belt is as if suspended between two supports and is thereby permitted to freely extend and to be compressed sufficiently without being squeezed, either outside or in the zone of the neutral plane or fiber. By preventing the disadvantageous squeezing, which is usual with known devices, and by providing support rollers only for the laterally extending strips of the conveyor belt, a perfect quidance of the both the belt and the plastic foam band attached thereto is assured also in the deflection area.

In cases where the supporting means are appropriate and the conveyor belt is stiff, the two supporting lateral strips may be sufficient in the deflection area. However, for supple plastic foam bands and elastic conveyor belts, it is useful to provide an additional back-up roller beneath the plastic foam band. In such a case, the perpendicular distance between the circumference of the back-up roller and the lateral strips of the conveyor belts should approximately be equal to the thickness of the inner, load-free foam layer of the band. Thus, the back-up roller serves to prevent a sag of the conveyor belt without simultaneously squeezing the foam layer.

Advantageously, the conveyor belt having the foam band is designed as a through-carrier covered on both sides by the plastic foam band. The foam band is then supported also in its central part, particularly when the conveyor belt is subjected to a prestress.

The conveyor belt, designed as a through-carrier, may take the form of a layer embedded in the plastic foam band and either consisting of the same, but only more densified, material as the band, or of another material and provided with means for retaining the foam band layer or layers. Such means may be through-holes provided in the embedded portion of the conveyor belt which, during the manufacture of the conveyor belt or the application of the foam layers, are penetrated by the foam so that a sure bond is established between the foam band and the embedded layer. In particular, the layer embedded in the foam band may be a flexible and elastic screen web having the advantage that even pieces of larger size can be conveyed reliably because, in such a case, the conveyor belt forming the carrier of the foam band is yielding and the foam band side facing away from the conveyed piece can also participate in the deformation.

For the same reasons, however, and provided that the foam band has an appropriate structure and mechanical resistance, the conveyor belt carrying the foam band may take the form of a strip protruding laterally into the interior of the foam band, so that, in the central zone, the band is not penetrated by any apparent carrier portion.

It may be advantageous, also, in considering the nature of the products to be conveyed, to provide the carrying conveyor belt in the form of a skin enclosing the foam band so that the lateral strips of the conveyor belt are connected to each other not through the interior of the foam band but over the exterior of the same. In addition, this skin may represent an excellent abrasion-proof surface of the foam band. Both the foam band and the skin may consist of a polyurethane, with the skin being more densified than the band.

The making of the plastic foam band more deformable on its side facing the deflection rollrs than on its outer side can also be instrumental in assuring a very satisfactory guidance of the foam band in the deflection area and a wrinkle-free squeezing of the same. For this purpose, the two layers of the foam band, above and below the conveyor belt, may consist of different materials, with the material facing the deflection rollers being more deformable than that of the upper or outer layer.

The unequal deformability advantageously may be attained also by providing recesses in the surface of the foam band facing the deflection rollers, with these recesses being closed at their lateral ends and permitting a tangential contraction of the foam band in the deflection area and thus a wrinkle-free rolling of the consecutive web ribs of the foam band surface, separated by the recesses. A formation of beads facing the deflection roller thereby is prevented. In order to avoid damage to the foam band, reduce the wear, and prevent deposition of dirt in the recesses, the latter may be covered by a skin, preferably of reinforced polyurethane. Advantageously this skin is so dimensioned as to arch into the recesses when passing the deflection area, and not to arch outwardly, which would lead to an increased wear and unfavorable guidance of the foam band in the deflection area. In the straight portions of the conveyor, the skin becomes flattened again to its normal length.

Should it be necessary, with respect to the products or articles to be conveyed, to provide an additional stiffening of the belt conveyor, reinforcements extending along the belt, may be embedded in the zone of the neutral fiber or plane. These reinforcements may be rods or wires, preferably of metal, but also of a synthetic material, for example, a polyester.

To prevent a lateral deviation of the belt conveyor, it is advantageous to provide the lateral strips of the conveyor belt, projecting from both of the narrow sides of the foam band, in the form of gear belts engaging correspondingly gear support rollers. In addition, a positive connection between the laterally located support rollers and the conveyor belt thereby is obtained, so that the support rollers can be used advantageously for driving the belt. In this case, the reinforcements, provided in the zone of the neutral fiber or plane also may be extended into the lateral gear strips of the belt.

A lateral deviation of the belt may also be prevented by providing the lateral strips, projecting from the band, with longitudinal beads which are guided in corresponding grooves of the support rollers. The lateral strips of the conveyor belt may take the form of V-belts or multi-V-belts guided in correspondingly designed deflection rollers.

The longitudinal beads may be provided with reinforcing inserts, such as wire cable or the like, which have the same purpose as the reinforcements in the lateral, possibly gear toothed, strips.

To prevent a squeezing of the foam band side facing the deflection rollers, or of the corresponding skin, it is possible, in accordance with a further advantageous feature of the invention, to provide the inner surface of the foam band or skin with a profile surface and the support rollers with a correspondingly profile circumference. Thus, the surfaces facing the support rollers are profiled so as to permit engagement with the profiled circumference of the rollers. In such a case, the circumferences of the additional back-up rollers are also profiled but have a more flattened shape or a smaller pitch because, in the straight portions of the conveyor, the profiled inner surface of the foam band or skin is stretched a greater amount.

The profiled surface may comprise ribs or beads integral with the foam band or skin, whose axes are parallel to one another, so as to permit a folding in the deflection area. The ribs or beads may be applied by vulcanization or may be subsequently stuck on. Additionally, reinforcements in the form of steel rods or wires, or polyester rods may be embedded in the ribs or beads.

An object of the invention is to provide an improved cover belt conveyor in which at least one of two mutually cooperable conveyors is provided, on its side facing the other conveyor, with a thick resilient deformable layer of plastic foam or the like serving to enclose products or articles to be conveyed.

Another object of the invention is to provide such an improved cover belt conveyor in which squeezing of the foam band in the deflection area is substantially prevented.

A further object of the invention is to provide such an improved cover belt conveyor in which perfect guidance is assured.

Yet another object of the invention is to provide such an improved cover belt conveyor in which the conveyor belt carrying the foam band extends laterally beyond the longitudinal edges of the foam band in the zone of the neutral fiber or plane to engage supporting elements in at least a deflection area, such as support rollers or the like.

For an understanding of the principles of the invention, reference is made to the following description of typical embodiments thereof as illustrated in the accompanying drawings.

GENERAL DESCRIPTION OF THE PREFERRED EMBODIMENTS

Figure 1:
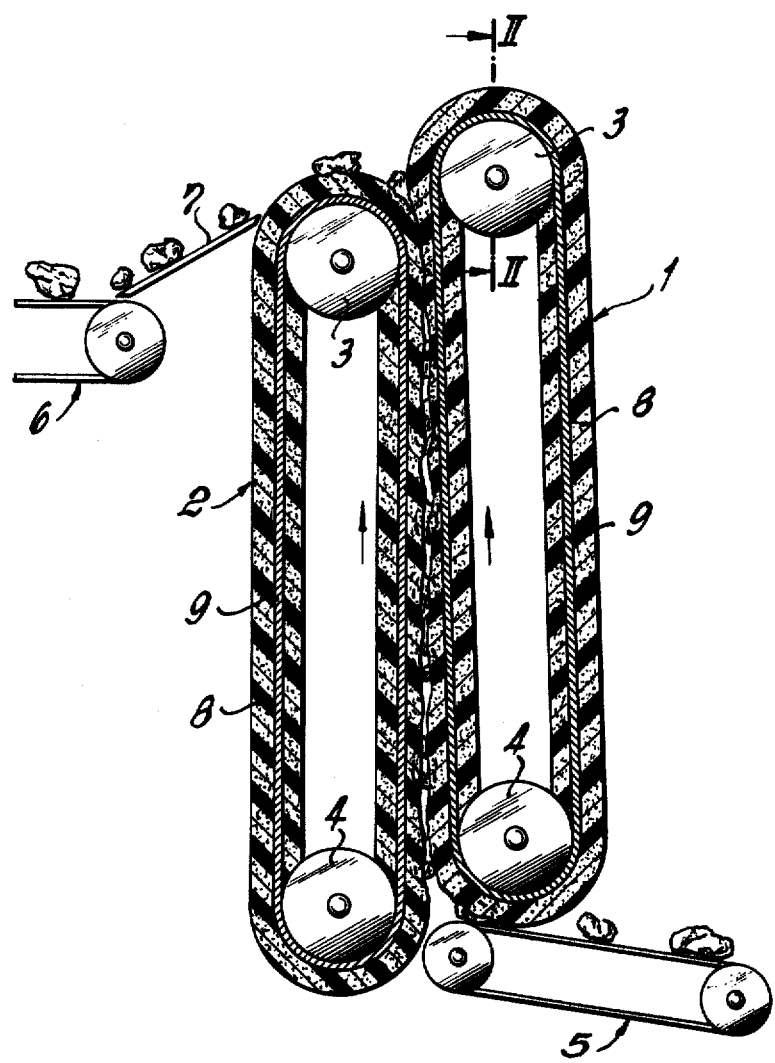
FIG. 1 is a somewhat schematic side elevation view, partly in section, of one embodiment of a cover belt conveyor in accordance with the invention.

Referring first to FIG. 1, the cover belt conveyor assembly shown therein comprises two belt conveyors 1 and 2 which are in contact at least along a part of the conveying distance in which they run in the same direction as indicated by the arrows. In their end areas, belt conveyors 1 and 2 are guided around deflection rollers 3 and 4 constituting support means for the conveyors. A feeding conveyor 5 supplies the cover belt conveyors with products which are removed by a discharge conveyor 6 to which the products are directed by a chute 7 extending between conveyor 2 and conveyor 6. Both belt conveyors 1 and 2 are provided with thick resiliently deformable layers 8 of plastic foam material or the like which, as represented, enclose the products to be conveyed so that, along the conveying distance, the products can be transported upwardly in the direction of the arrows.

Conveyor belt proper 9, carrying plastic foam band 8, is mounted, as can be seen in FIG. 1, approximately in the zone of the neutral fiber or plane of the plastic foam band 8 as considered in the deflection area of conveyor belt 9, and is directly guided on deflection rollers 3 and 4 while plastic foam band 8 passes between the laterally spaced rollers.

Figure 2:
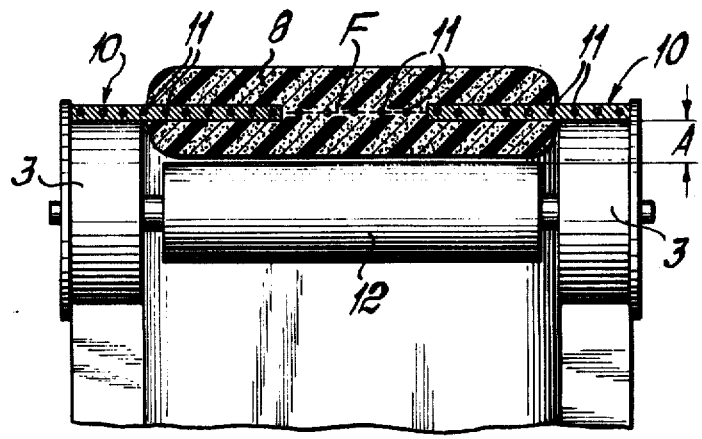
FIG. 2 is a partial sectional view taken along the line II—II of FIG. 1.

This arrangement is clearly illustrated in FIG. 2. Approximately in the zone of the neutral fiber or plane F in the deflection area, two strips 10 of conveyor belt 9, such as shown in FIG. 1, are embedded laterally in plastic foam band 8 so as to project therefrom in the form of elongated lugs or strips. Furthermore, in the embodiment shown in FIG. 2, the conveyor is provided with reinforcements 11 extending along the belt, and these reinforcements may be inserted both in plastic foam band 8 and in lateral strips 10, and may consist of metal or polyester rods or wires.

As also shown in FIG. 2, a back-up roller 12 is mounted additionally inside a plastic foam band 8 in order to prevent a deformation or sagging of foam band 8 in the space intermediate the deflection rollers 3. Back-up roller 12 may be omitted by providing an appropriate structure of the foam band and of the carrying belt 9. It will be noted that roller 12 is spaced from neutral fiber or plane F by the thickness of the undeformed inner portion of plastic foam band 8.

Figure 3:
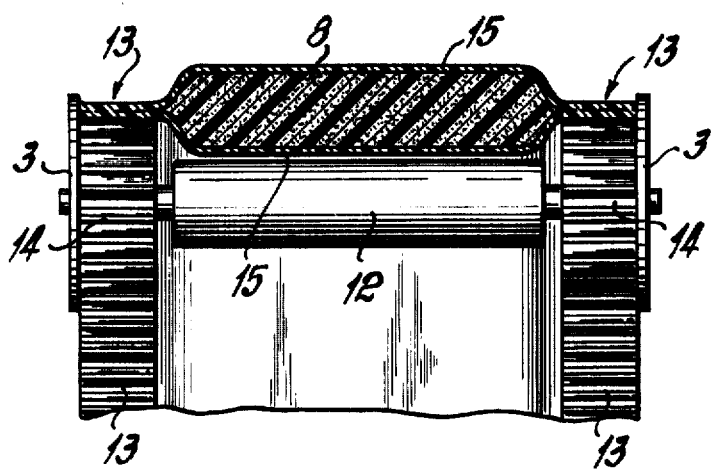
FIGS. 3, 3a 4 and 4a are sectional views, corresponding to FIG. 2, and illustrating other embodiments of the invention.
Figure 3A:
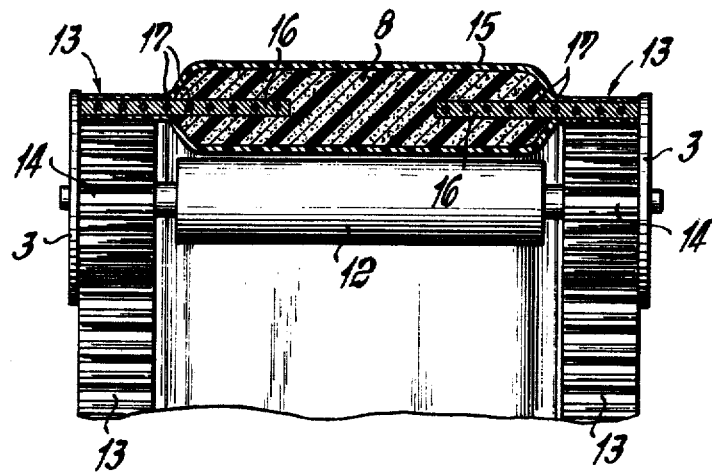

FIGS. 3 and 3a show two further embodiments of the cover belt conveyor embodying the invention. In both embodiments, the lateral strips projecting from foam band 8 are designed as toothed or geared belts 13, and deflection rollers 3 are provided with corresponding teeth 14. In the embodiment shown in FIG. 3, gear belt 13 is connected to foam band 8 so that the conveyor belt carrying foam band 8 is extended in the form of a skin 15 enclosing the foam band on both the upper and the lower side, in the illustrated example. It is possible, however, to provide the skin 15 only on one side of band 8.

In the embodiment of the invention shown in FIG. 3a, gear belt 13 is connected to lugs 16 extending into and embedded in plastic foam band 8, both lugs 16 and gear belt 13 being reinforced by inserts of metal wires 17 or the like. As illustrated, an additional connection of the skin 15 is possible.

Figure 4:
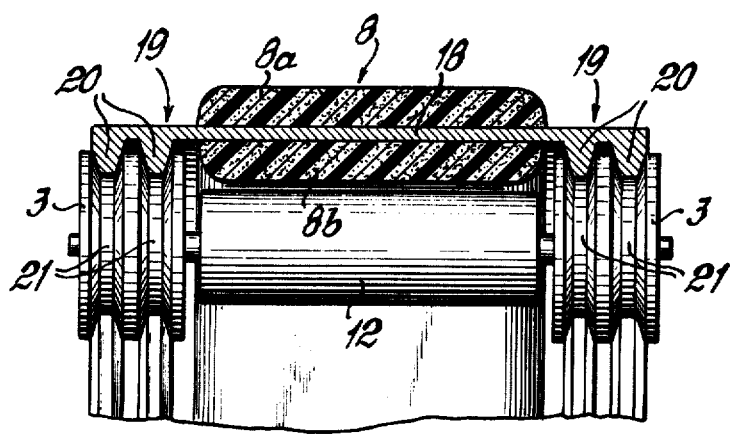
Figure 4A:
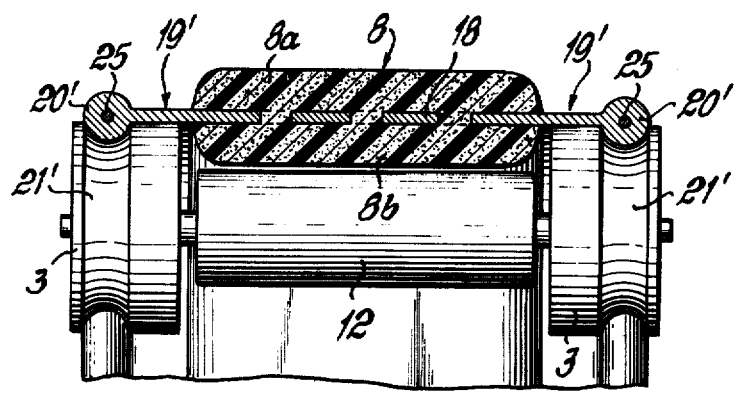

FIGS. 4 and 4a show two further embodiments of the invention, in which conveyor belt 9 is designed as a through-carrier 18 extending through plastic foam band 8 from one side to the other. Carrier 18 may be designed as a layer provided with through-holes, or as a flexible screen web, assuring a sufficient flexibility for receiving the conveyed products as well as a reliable bond with foam band 8.

In the embodiment of the invention shown in 4, the lateral strips of conveyor belt 9 are designed as multi-V-belts 19, and deflection rollers 3 are correspondingly circumferentially profiled so that the individual strips 20 of the V-belt engage corresponding grooves 21 in deflection rollers 3.

In the embodiment of the invention shown in FIG. 4a, the two lateral strips 19', projecting from opposite narrow sides of foam band 8, are provided with beads 20' which are guided in corresponding grooves 21' of deflection rollers 3. Longitudinal beads 20' may be provided with reinforcements, such as wire cables 25 having the same purpose as the reinforcements 11 or 17 in the embodiments of FIGS. 2 and 3a, respectively. In order to assure a perfect deformation in the deflection area, the lower layer 8b of foam band 8 may be made more deformable than upper layer 8a, for which purpose the two layers 8a and 8b may also be made of respective different materials.

Figure 5:
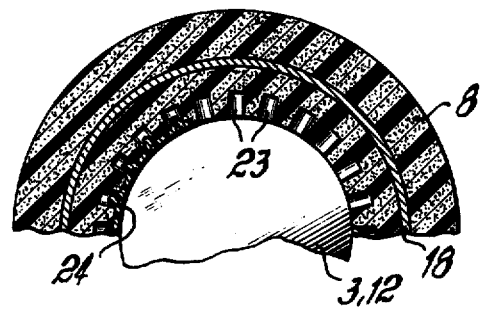
FIG. 5 is a longitudinal sectional view of a plastic foam having recesses on its inner side.
Figure 6:
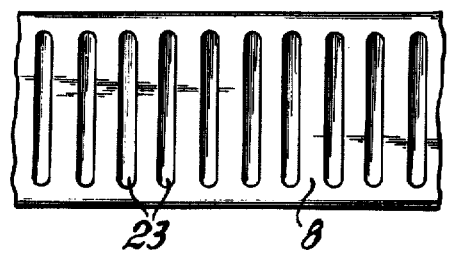
FIG. 6 is a inside plan view of the plastic foam band shown in FIG. 5.

In the embodiment of the invention shown in FIGS. 5 and 6, foam band 8 is formed with recesses 23 in the band surface facing deflection rollers 3, and these recesses are closed at their lateral ends but open in a direction facing the deflection rollers. The recesses serve to facilitate guiding of foam band 8 around deflection rollers 3, or around back-up rollers 12. As indicated, recesses 23 may be covered with a skin 24 which is dimensioned so that, in the deflection area, it can arch into the recesses 23 and is hindered from arching outwardly, which could lead to an increased wear and an unfavorable guidance of the foam band in the deflection area. In the straight sections of the conveyor, skin 24 becomes flattened again to its original length.

Figure 7:
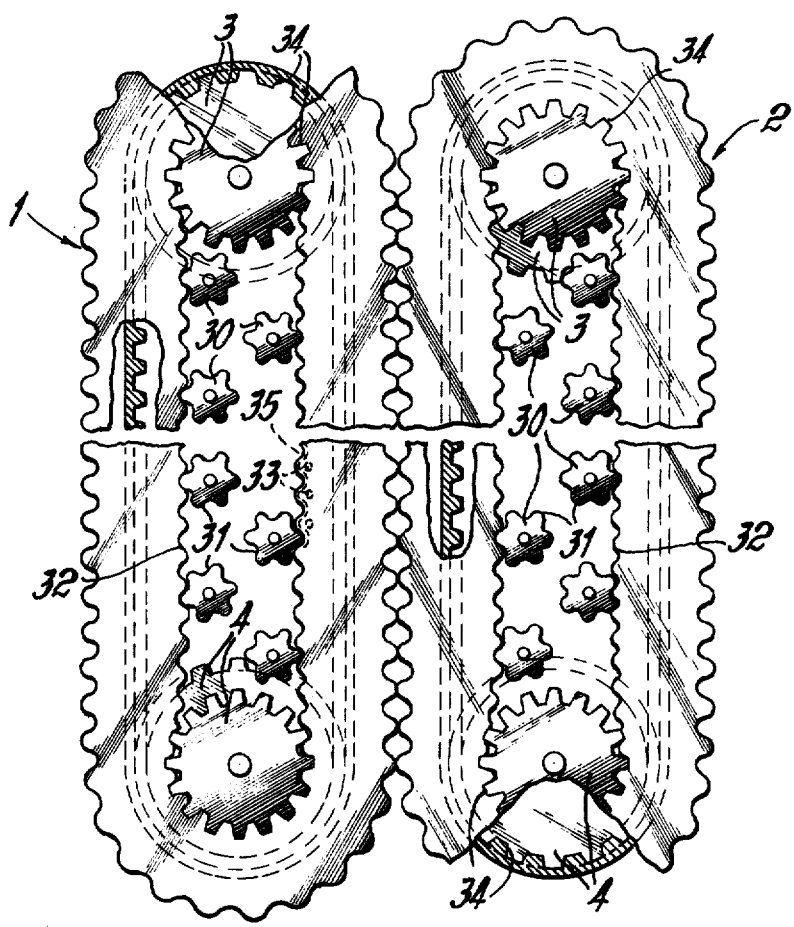
FIG. 7 is a side elevation view, partly broken away and partly in section, of a cover belt conveyor in which the inner side of the plastic foam band as well as the deflection and back-up rollers are provided with profiled surfaces.

In the embodiment of the invention shown in FIG. 7, the inner surfaces of foam bands 8 and/or a covering skin applied thereon, are provided with profiled surfaces 32 and supported by back-up rollers 30. Back-up rollers 30 and deflection rollers 3 have correspondingly profiled circumferences 31 and 34, respectively, in which the profiled inner surfaces 32 of the foam bands or of the skin engage. The profile surfaces 32 and 35 may be formed by axially parallel ribs or beads which may be integral with their substrate or which may be subsequently vulcanized or stuck thereon. Reinforcements, in the form of steel rods or wires or polyester rods 33, may be embedded in the ribs or beads.

The axially parallel protruding portions of the profiled inner surfaces of the foam band or coating skin also represent a certain prefolding owing to which a squeezing of the band surfaces, facing the rollers 3 in the deflection area, is prevented. In this area, the inner side of the foam band or of the coating skin contracts, as shown, so that the protruding portions 34 engage the profile circumferences of deflection rollers 3. To permit a correct engagement, deflection rollers 3 have a higher circular pitch than back-up rollers 30 because, in the straight portions of the conveyor, the profiled inner surfaces of the foam bands or skins again are stretched. This prefolding assures a perfect guidance of the foam band around the deflection rollers without squeezing it, whereby the wear also is reduced to a minimum.

While specific embodiments of the invention have been shown and described in detail to illustrate the application of the principles of the invention, the invention may be embodied otherwise without departing from such principles.

What is claimed is:

1. In a cover belt conveyor assembly of two endless belt conveyors running, in at least a part of the conveying distance, in mutual contact and in the same direction, the endless belt conveyors having direction changing deflection areas and at least one of the belt conveyors having, extending longitudinally of its surface facing the other belt conveyor, a thick resiliently deformable layer of a plastic foam material, for enclosing articles to be conveyed, the layer of a plastic foam material having longitudinal edges extending in the conveying direction and being stressed, transversely of its thickness, in both compression and tension, on opposite sides of a neutral plane, at the direction changing deflection areas of the at least one belt conveyor, the improvement comprising, in combination, said at least one belt conveyor, in the neutral plane of the plastic foam material layer thereon, projecting outwardly beyond the longitudinally extending side edges of said layer to form outwardly projecting lateral support strips extending longitudinally of the conveying direction; and support means engaging said lateral support strips at least in the direction changing deflection areas of said at least one belt conveyor.

2. In a cover belt conveyor assembly, the improvement claimed in claim 1, including a back-up roller in the deflection area inside of the layer of plastic foam material.

3. In a cover belt conveyor, the improvement claimed in claim 2, in which the perpendicular distance between the periphery of said back-up roller and said lateral strips is substantially equal to the thickness of the undeformed inner portion of said plastic foam layer.

4. In a cover belt conveyor, the improvement claimed in claim 1, in which said at least one belt conveyor is designed as a through-carrier covered on both surfaces by said layer of plastic foam material.

5. In a cover belt conveyor, the improvement claimed in claim 4, in which said through-carrier comprises a layer embedded in said layer of plastic foam material.

6. In a cover belt conveyor, the improvement claimed in claim 5, in which said embedded layer is formed with through-holes.

7. In a cover belt conveyor, the improvement claimed in claim 5, in which said embedded layer is a flexible and elastic screen web.

8. In a cover belt conveyor, the improvement claimed in claim 1, in which said at least one belt conveyor is designed as a strip protruding into the interior of said layer of plastic foam material.

9. In a cover belt conveyor, the improvement claimed in claim 1, in which said at least one belt conveyor comprises a skin enclosing said layer of plastic foam material.

10. In a cover belt conveyor, the improvement claimed in claim 9, in which said layer of plastic foam material and said skin comprise a polyurethane, with said skin being more densified than said layer of plastic foam material.

11. In a cover belt conveyor, the improvement claimed in claim 1, in which said plastic foam material layer is more deformable on its side facing said support means than on its exterior side.

12. In a cover belt conveyor, the improvement claimed in claim 11, in which the portion of said layer of plastic foam material facing said support means on the inner side of said at least one belt conveyor and the portion of said layer of plastic foam material on the outer side of said at least one belt conveyor are formed of different materials; the material of the portion on the inner side of said at least one belt conveyor, facing said support means, being more deformable than the material of said portion of said plastic foam material on the outer surface of said at least one belt conveyor.

13. In a cover belt conveyor, the improvement claimed in claim 11, in which said layer of plastic foam material, in its surface facing said support means, is formed with transversely extending recesses closed at the edges of said layer but opening toward said support means.

14. In a cover belt conveyor, the improvement claimed in claim 13, in which said recesses are covered by a skin.

15. In a cover belt conveyor, the improvement claimed in claim 14, in which said skin is a reinforced polyurethane.

16. In a cover belt conveyor, the improvement claimed in claim 1, including reinforcements extending along said at least one belt conveyor in said neutral plane.

17. In a cover belt conveyor, the improvement claimed in claim 16, in which said reinforcements are embedded in said layer of plastic foam material.

18. In a cover belt conveyor, the improvement claimed in claim 16, in which said reinforcements are embedded in said lateral support strips.

19. In a cover belt conveyor, the improvement claimed in claim 16, in which said reinforcements are elongated metal elements.

20. In a cover belt conveyor, the improvement claimed in claim 16, in which said reinforcements are elongated elements of a polyester.

21. In a cover belt conveyor, the improvement claimed in claim 1, in which said lateral support strips are designed as gear belts.

22. In a cover belt conveyor, the improvement claimed in claim 21, including reinfocements in the zone of said neutral plane and also in said lateral support strips.

23. In a cover belt conveyor, the improvement claimed in claim 21, in which said support means comprise rollers; the teeth of said gear belts engaging gear wheels coaxial with said rollers.

24. In a cover belt conveyor, the improvement claimed in claim 1, in which said lateral support strips are formed with longitudinal beads; said support means comprising support rollers formed with circumferential grooves engaging said beads.

25. In a cover belt conveyor, the improvement claimed in claim 1, in which said lateral support strips are designed as V-belts; said support means comprising support rollers formed with circumferentially extending V-grooves meshing with said V-belts.

26. In a cover belt conveyor, the improvement claimed in claim 24, including reinforcing inserts in said longitudinal beads.

27. In a cover belt conveyor, the improvement claimed in claim 14, in which said covering skin is so structured that, in the deflection area, it arches inwardly into recesses.

28. In a cover belt conveyor, the improvement claimed in claim 1, in which that side of said layer of plastic foam material facing said support means is provided with profiled surfaces; said support means comprising back-up rollers and deflection rollers formed with teeth corresponding to said profiled surfaces.

29. In a cover belt conveyor, the improvement claimed in claim 9, in which that side of said covering skin facing said support means is provided with profiled surfaces; said support means comprising back-up rollers and deflection rollers formed with teeth corresponding to said profiled surfaces.

30. In a cover belt conveyor, the improvement claimed in claim 28, in which said profiled surfaces are formed by ribs integral with the inner side of said layer of plastic foam material facing said support means.

31. In a cover belt conveyor, the improvement claimed in claim 30, in which said ribs are axially parallel to each other.

32. In a cover belt conveyor, the improvement claimed in claim 30, in which said ribs are vulcanized to said layer of plastic foam material.

33. In a cover belt conveyor, the improvement claimed in claim 30, in which said ribs are stuck onto said layer of plastic foam material.

34. In a cover belt conveyor, the improvement claimed in claim 28, including reinforcements embedded in said ribs.

* * * * *